US008979995B2

(12) United States Patent
Meyer et al.

(10) Patent No.: US 8,979,995 B2
(45) Date of Patent: Mar. 17, 2015

(54) SUSPENSION FOR PRODUCING A LAYER INCREASING THE COEFFICIENT OF FRICTION, MOLDED PART HAVING SUCH A LAYER INCREASING THE COEFFICIENT OF FRICTION, METHOD FOR THE PRODUCTION THEREOF, AND USE THEREOF

(75) Inventors: Jürgen Meyer, Kempten (DE); Timo Sörgel, Weinstadt (DE); Krishna Uibel, Waltenhofen (DE); Sven Schreiner, München (DE)

(73) Assignee: 3M Innovative Properties Company, St. Paul, MN (US)

( * ) Notice: Subject to any disclaimer, the term of this patent is extended or adjusted under 35 U.S.C. 154(b) by 452 days.

(21) Appl. No.: 13/322,811

(22) PCT Filed: May 26, 2010

(86) PCT No.: PCT/EP2010/003198
§ 371 (c)(1),
(2), (4) Date: Jan. 27, 2012

(87) PCT Pub. No.: WO2010/136190
PCT Pub. Date: Dec. 2, 2010

(65) Prior Publication Data
US 2012/0118203 A1   May 17, 2012

(30) Foreign Application Priority Data
May 29, 2009   (DE) .......................... 10 2009 023 402

(51) Int. Cl.
*F16B 39/22*   (2006.01)
*F16D 69/02*   (2006.01)
*F16B 2/00*   (2006.01)
*F16D 1/08*   (2006.01)

(52) U.S. Cl.
CPC ................ *F16D 69/02* (2013.01); *F16B 2/005* (2013.01); *F16B 39/22* (2013.01); *F16D 1/08* (2013.01); *F16D 2300/10* (2013.01)

USPC ....................................................... 106/286.5

(58) Field of Classification Search
None
See application file for complete search history.

(56) References Cited

U.S. PATENT DOCUMENTS 6,347,905 B1   2/2002   Lukschandel

FOREIGN PATENT DOCUMENTS

| DE | 103 26 815 A1 | 12/2004 |
| DE | 10 2005 050 593 A1 | 4/2007 |
| DE | 10 2007 053 284 A1 | 5/2009 |
| EP | 0 961 038 A1 | 12/1999 |
| EP | 1 780 307 A2 | 5/2007 |
| EP | 1 985 594 A1 | 10/2008 |
| EP | 2 058 289 A1 | 5/2009 |

OTHER PUBLICATIONS

Data Sheet "Disperal®/Dispal®" of the company Sasol, status Jan. 2003, 10 pages, www.sasol.com; (2003).

*Primary Examiner* — Melissa Swain
(74) *Attorney, Agent, or Firm* — Nath, Goldberg & Meyer; Jerald L. Meyer; Katelyn J. Bernier

(57) ABSTRACT

The invention relates to a suspension for producing a friction-increasing layer on a substrate, which comprises a liquid suspension medium, a predominantly inorganic binder or precursor compounds thereof and suspended hard material particles. The invention further relates to a shaped body comprising a substrate and a friction-increasing layer which has been applied to at least part of the surface of the substrate and comprises a predominantly inorganic binder matrix and hard material particles embedded therein, where the thickness of the binder matrix is less than the average particle size of the hard material particles so that the hard material particles project from the binder matrix and where the friction-increasing layer has been formed from a suspension according to the invention. The invention likewise relates to a process for producing the abovementioned shaped bodies and also their use for producing press or clamp connections and also as securing element.

17 Claims, No Drawings

SUSPENSION FOR PRODUCING A LAYER INCREASING THE COEFFICIENT OF FRICTION, MOLDED PART HAVING SUCH A LAYER INCREASING THE COEFFICIENT OF FRICTION, METHOD FOR THE PRODUCTION THEREOF, AND USE THEREOF

This is a National Phase Application filed under 35 U.S.C. §371 as a national stage of PCT/EP2010/003198, filed on May 26, 2010, an application claiming the benefit under 35 U.S.C. §119 of German Application No. 10 2009 023 402.0, filed on May 29, 2009, the content of each of which is hereby incorporated by reference in their entirety.

FIELD OF THE INVENTION

The present invention relates to a suspension for producing a friction-increasing layer on a substrate, a shaped body composed of a substrate and a friction-increasing layer applied thereto, a process for producing such a shaped body and the use of such shaped bodies for producing press or clamp connections or as securing element for screw connections. The friction-increasing layer provided according to the invention is distinguished by its static friction-increasing properties, temperature stability and corrosion stability and can be applied to large-area components and different materials.

BACKGROUND TO THE INVENTION

Frictional connections are frequently used to transmit transverse forces or torques in all fields of mechanical engineering. The magnitude of the force which can be transmitted in each case depends not only on the structural circumstances but first and foremost on the coefficient of static friction of the component surfaces to be connected to one another. Steel/steel pairings typically have coefficients of static friction of 0.15, which due to the increasingly demanding requirements to be met by machine components frequently is not sufficient for a secure frictional connection.

Physical locking or micro-physical locking enables the force which can be transmitted to be increased at a constant contact pressure. This principle has been known for a long time, for example by introduction of sand into the gap of a joint. However, this type of introduction of particles is very undefined and in the case of relatively coarse particles which preferentially remain lodged in the gap, there is a considerable increase in the risk of initiation of cracks in the base material.

Likewise, screw connections are used in all fields of machine, plant and vehicle construction in order to achieve frictional connections. Particularly in the case of dynamic stressing of the screw connections, many conventional screw connections do not ensure sufficient security against spontaneous release of the screw connections. Efforts are therefore made to provide measures for securing screw connections in order to prevent spontaneous release of the screw connections in the case of high and in particular dynamic stresses.

PRIOR ART

A variant of a friction-increasing layer which can be used industrially in many cases is the electrochemical or chemical (free of external current) application of a metallic layer in which hard material particles are embedded. Electrochemically applied dispersion layers are, for example, described in Peeken et al., ant-Antriebstechnik 1981, 20.

Apart from direct coating of the component, the static friction-increasing coating of thin foils/films has also been found to be advantageous. This is described in EP 0 961 038 A1. Such coated foils/films can be used when the desired coating cannot be applied to either of the two components for process or cost reasons. Micro-physical locking then occurs via the foil/film placed between the surfaces to be joined.

WO 2008/095216 A2 describes a chain sprocket wheel having a friction coating composed of a synthetic binder with applied friction particles. The synthetic binder is selected from a group of organic polymers. The coating proposed here is said to be an alternative solution which is at least approximately equivalent to the known methods of increasing the security against twisting on chain sprocket wheels and is cheaper to mass produce.

EP 1 959 152 A2 describes a friction coating which comprises a binder matrix and friction particles, with at least 20% of the friction particles having a diameter greater than the thickness of the layer. The friction particles are either sprinkled onto the binder or a dispersion comprising the binder and the friction particles is produced and this dispersion is applied to the functional surface of the friction component. Binders used are organic polymers, preferably a phenolic resin, and friction particles used are preferably silicon carbide particles.

The coatings having purely organic polymer binders as described in WO 2008/095216 A2 and EP 1 959 152 A2 have the disadvantage that these binders can age and become brittle and can decompose when subjected to thermal stress. This can firstly result in a disadvantageous change in the surface region of the elements to be joined due to diffusion processes and, secondly, the binder matrix can be decomposed so that breaking-out of particles and seizing phenomena of the connection can occur and the friction-increasing effect is no longer reliably achieved.

In addition, there is a risk in the case of the purely organic polymer binders of WO 2008/095216 A2 and EP 1 959 152 A2 that the friction particles are not sufficiently wetted by the binder and the friction particles are therefore not sufficiently embedded in the friction coating.

Static friction-increasing coatings according to WO 2008/095216 A2 and EP 1 959 152 A2 are not suitable when a very large increase in the coefficient of friction is required.

The dispersion layers described by Peeken et al., ant-Antriebstechnik 1981, 20 and the dispersion-coated foils/films described in EP 0 961 038 A1 achieve high coefficients of friction which also meet present-day industrial requirements for frictional connections.

These coatings display disadvantages when very large components are to be coated. For example, drive shafts, bearing seats and hubs of large machinery items such as ships' drives and wind turbines cannot be coated economically, if at all, due to the limited coating bath dimensions.

Apart from metallic lightweight materials of construction, plastics and ceramics are increasingly being used as light materials of construction. In frictional connections, this makes it necessary to provide electrically nonconductive friction surfaces with a friction-increasing coating. When electrochemically deposited dispersion layers are used, this cannot be achieved or can be achieved only with limitations since only few plastics can be coated. Although the coating of nonconductors can be made possible by appropriate activation, such coatings generally cannot be produced economically, and in addition the layer adhesion is poorer than on metallic substrates.

In engine technology, measures for reducing emissions and for reducing fuel consumption are leading to new potential applications for friction-increasing coatings in the region of exhaust gas regulation and of the turbocharger which even exceed the temperature limits of the electrochemically deposited dispersion layers. For these applications, heat resistance up to about 850° C. is required. At these temperatures, the chemical nickel layers which are customarily used melt. These layers are therefore suitable for long-term use only up to about 450° C.

The heat resistance of the polymer coatings described in WO 2008/095216 A2 is likewise limited, and use temperatures above 300° C. are virtually unachievable. Thus, these coatings cannot be used for most transverse-pressure seats (shaft-hub connections) and use in the high-temperature applications described is not possible.

A distinction can be made in general between two groups of methods of securing screw connections, namely mechanical and chemical. The former are generally elements which are inserted between the screw head and the substrate and lead, due to their macroscopic structuring, to macro-physical locking with the screw head and the substrate material. This results in macroscopic damage to these opposing surfaces, which also has an adverse effect on the screw connection to be done a second time. In addition, seizing phenomena can be pronounced in the case of macroscopically structured, mechanical methods of securing screw connections according to the prior art, which is a disadvantage in terms of the securing effect. The second group of methods of securing screw connections is based on chemical securing, in which adhesives, optionally firstly microencapsulated and in the form of a plurality of components, are applied directly to the screwthread. Disadvantages of these securing methods are, inter alia, the low heat resistance.

OBJECT OF THE INVENTION

It is therefore an object of the invention to provide a friction-increasing layer on a substrate, which layer avoids the disadvantages of the prior art and, in particular, has coefficients of friction which correspond at least to those of EP 0 961 038 A1 and are superior to those of WO 2008/095216 A2, is thermally stable and stable to corrosion and electrically nonconductive and also can be applied to large-area components and different materials. The friction-increasing layer of the invention should, in particular, be suitable for producing press or clamp connections, as securing element for screw connections and also for direct coating of screw connections to secure the screw.

SUMMARY OF THE INVENTION

The abovementioned object is achieved by a suspension for producing a friction-increasing layer, a shaped body, and a process for producing such a shaped body as described herein. Advantageous and particularly useful embodiments of the subject matter of the present patent application are indicated in the dependent claims.

The invention accordingly provides a suspension for producing a friction-increasing layer on a substrate, which comprises a liquid suspension medium, a predominantly inorganic binder or precursor compounds thereof and suspended hard material particles.

The invention further provides a shaped body comprising a substrate and a friction-increasing layer which has been applied to at least part of the surface of the substrate and comprises a predominantly inorganic binder matrix and hard material particles embedded therein, where the thickness of the binder matrix is less than the average particle size of the hard material particles so that the hard material particles project from the binder matrix and where the friction-increasing layer has been formed from a suspension according to the invention.

The invention likewise provides a process for producing a shaped body as described above, which comprises the steps
a) provision of a substrate,
b) application of a suspension according to the invention as described above to at least part of the surface of the substrate,
c) drying of the coating obtained in this way and
d) optionally heat treatment of the coating obtained in step c) in order to cure the coating and/or mechanical treatment of the coating obtained in this way.

The invention likewise provides for the use of a shaped body according to the invention for producing press or clamp connections in an assembly with a shaped body which if desired likewise has a friction-increasing layer, preferably for producing shrink fittings such as shaft-hub connections and flange connections, and also the use of a shaped body according to the invention as securing element for screw connections, which is used as intermediate layer between screw head and substrate material and/or between nut and substrate material. In addition, to secure screw connections, the layer according to the invention can be applied directly under the screw head or to the nut or the substrate material or directly to the thread.

According to the invention, it is possible to apply friction-increasing coatings having embedded hard material particles to a substrate in a simple, defined and reproducible way. The result is a shaped body which is provided over its entire surface or in subregions of its surface with a static friction-increasing coating which adheres well, where the coating comprises a binder matrix in which hard material particles are embedded, preferably in a monolayer, and are held firmly by the binder matrix but are not completely embedded therein.

The firmly adhering layer is distinguished by its thermal stability, corrosion stability, ability to be applied to large-area components and different materials and also static friction-increasing properties. The static friction-increasing properties are also achieved for friction partners having different hardnesses. The coatings of the invention make it possible to obtain coefficients of static friction which are superior to those of WO 2008/095216 A2 and EP 1 959 152 A2 and correspond at least to those described in EP 0 961 038 A1.

Surprisingly, the binder matrix itself obviously has friction-increasing properties. This can be explained by the hard material particles penetrating into both surfaces, those of the substrate and the joint partner, and no microgap therefore remaining and a significant force component being transmitted via the matrix. A possible explanation for the higher coefficients of friction compared to WO 2008/095216 A2 and EP 1 959 152 A2 could be the generally higher surface energy of the binders used according to the invention compared to organic binder matrices. In the case of electrochemically deposited dispersion layers, the hard material particles do not penetrate into the coated substrate but only into the joint partner and, at standard contact pressures of 50 MPa, there is generally a microgap, in contrast to the coatings according to the invention.

The coating according to the invention can be applied in a simple way, in a defined manner and reproducibly. The first two properties (simple, defined) are advantages over electrochemically deposited dispersion coatings since these cannot be applied in a simple way and can be applied in a defined manner to only a limited extent to particular regions since masking is complicated.

The layer according to the invention can also be applied economically virtually without any component size restriction, which is likewise an advantage over the more complicated direct coating method from Peeken et al.

The layers according to the invention can be used in engine and gearbox construction. In addition, the coating according to the invention can be applied with good adhesion and economically to all known materials of construction.

In use, the layers according to the invention display, compared to the layers described in WO 2008/095216 A2 and EP 1 959 152 A2, a greater increase in the coefficient of static friction for the same friction partners (see examples E12 and E14 and comparative example C10).

It has been able to be shown that comparatively very high coefficients of static friction which are even comparable with those achieved using layers according to EP 0 961 038 A1 can be achieved according to the invention. In addition, in some cases there is even a significant increase possible compared to the present-day prior art (see example E8 and comparative example C9).

To ensure very high coefficients of static friction in use, it is advantageous according to the invention when the applied hard material particles penetrate significantly both into the substrate and into the counter body when pressing the coated component against the uncoated component, in contrast to electrochemically deposited coatings in which the hard material particles do not penetrate into the coated substrate but only into the joint partner.

It has surprisingly been found that this is possible even in the case of great hardness differences between substrate material and counter body, so that the coatings according to the invention can be used even at large hardness differences between substrate material and counter body and higher coefficients of friction can be achieved in the case of such material pairings having great hardness differences, for example in the case of AlMgSi1 paired with GG25, see example E4.

Owing to the very homogeneous layer thickness distribution and the comparatively low layer thickness which can be set very precisely (layer thicknesses of only 5-10 μm can be obtained reproducibly), particles having the minimum particle size required to achieve the increase in coefficient of friction can be used, so that the risk of damage to the substrate by initiation of cracks is reduced to a minimum.

The binder matrix of the coating according to the invention can be applied in a very controlled manner in terms of its layer thickness and layer thickness distribution. This is important since it thus makes it possible to ensure that in each case only one layer of hard material particles is present on the surface and these particles protrude to a significant extent in order to reliably be able to press into the counter surface under the conditions of later use.

The coating can be applied selectively without problems with a comparatively small outlay, which is particularly important especially when presence of the layer outside the functional area is not only superfluous but, in particular, unacceptable. This is, for example, the case for components whose surface has to meet different functional requirements at different places, for instance in the case of friction-increasing surface regions side by side with friction-reducing surface regions. This is an advantage over the direct coatings known from Peeken et al., since the risk of migration of the covering layers under other covering layers is lower in the case of the coatings according to the invention than in the case of electrochemical processes or processes without an external current.

Good to very good adhesion of the layer to a wide variety of substrate materials can be achieved. Thus, for example, metals, oxidic and nonoxidic ceramics, plastics, glasses or organic materials such as wood or composite materials composed of these materials can be coated without problems.

The heat resistance of the layers can, depending on the layer system, be very high and use temperatures above 1000° C. are possible. The good heat resistance of the layers according to the invention is obtained particularly when a sol-gel matrix is completely "ceramicized", i.e. it no longer contains any organic groups and is present as a purely inorganic binder matrix. The heat resistance which can be achieved goes far beyond that of most substrates. Owing to the usually likewise very good heat resistance of the embedded hard material particles, the maximum use temperature is in most cases determined and limited only by the substrate material. This is especially important for high-temperature applications (see above under prior art, example from engine technology) in which it is not possible to use any organic polymer coatings and sometimes also no metallic coatings, for example chemical nickel, since these no longer function at temperatures above about 870° C. (depending on the phosphorus content) due to softening/melting. They can therefore be used in the long term only up to about 450° C.

In contrast to the organic polymer coatings of WO 2008/095216 A2 and EP 1 959 152 A2, the risk of aging is significantly reduced in the case of the coatings according to the invention. No decomposition of the binder matrix takes place in use and the coatings can be used in the long term. This applies particularly to the purely inorganic binder matrices or binder matrices having a predominant proportion of inorganic material.

A further advantage of the layers according to the invention is that when different friction partners are paired, the risk of contact corrosion is greatly reduced since the coating is electrically nonconductive so that no metallic contact of the two surfaces of the friction partners occurs. The coatings according to the invention reduce the corrosion risk for the substrate material.

The application of the layer can, compared to electrochemical and especially chemical (without external current) processes (chemical nickel is described, for example, in N. Kanani, Chemische Vernicklung, 1st edition, Leuze, Bad Saulgau, 2007), be carried out in a very short time, with complete automation also being possible due to the comparatively low requirements for masking. Such a coating plant can be integrated directly into a production line. This makes it possible to achieve high operational and cost savings, for example as a result of reduced dependence on suppliers, saving of storage space and time and also logistical advantages since the parts to be coated do not have to be sent to a coater and back again.

In contrast to the introduction of the friction-increasing layer into the joint gap by installation of a coated foil/film as per EP 0 961 038 A1 which results, depending on the foil/film thickness, in a considerable additional size, the tolerances of the overall system are virtually never exceeded in the case of the application of the layer described here to one of the two surfaces to be joined. This is advantageous in the case of very strict tolerances and also from the point of view of minimizing construction space.

Due to high variability in its composition, a sol-gel layer matrix, in particular, can be matched further to the respective requirements in terms of its properties by means of additives. Thus, for example, the layer adhesion and mechanical stability of the layer can be improved by addition of suitable nanoparticles. In addition, the coefficient of thermal expansion of the layer can be matched within a wide range to the substrate material, which is advantageous when, for example, the coated substrate has to be stretched by means of an increase in temperature immediately before a joining process, for example in a shaft/hub connection. Matching to the substrate material can be effected by incorporation of fillers or nanoparticles. The joining temperature of the hub partner is typically >300° C., which virtually rules out the use of organic matrices as described in WO 2008/095216 A2 and EP 1 959 152 A2.

DETAILED DESCRIPTION OF THE INVENTION

The coating suspension of the invention contains a liquid suspension medium, a predominantly inorganic binder and suspended hard material particles.

The liquid suspension medium can be selected from among water, water-containing solvents, alcoholic solvents, for example ethanol, and mixtures thereof.

The predominantly inorganic binder can comprise a ceramic material or a precursor of a ceramic material. The binder can be an inorganic and/or mineral or organically modified inorganic and/or mineral material which can additionally be admixed with organic additives and/or inorganic solid particles. For the present purposes, a "predominantly inorganic binder" is a binder which generally comprises more than 50% of inorganic constituents.

The binder (in the coating suspension) can contain precursors of one or more inorganic materials and/or glass precursors. Preference is given to using a binder from production via a sol-gel process ("sol-gel binder"). The binder is preferably an $SiO_2$-based binder.

The binder is also preferably a nanocomposite derived from silicon-organic $SiO_2$ precursors produced via a sol-gel process and containing nanosize solid particles. These nanosize solid particles preferably have an average particle size of up to 100 nm and are preferably selected from among metal oxide particles selected from among $SiO_2$, $TiO_2$, $ZrO_2$, $Al_2O_3$, AlOOH, $Y_2O_3$ and $CeO_2$, c-BN, $BaSO_4$, mixtures of these or precursors of these nanosize solid particles which are converted via a sol-gel process into these solid particles, more preferably $SiO_2$ solid particles.

Furthermore, the binder can contain inorganic fillers and organic auxiliaries. The inorganic fillers used preferably have an average particle size of up to 5 μm, in particular up to 1 μm, and are preferably selected from among oxides, nitrides, carbides and diamond. Organic auxiliaries can be used, for example, as plasticizers, foil/film formers or antifoams.

The binder can have a purely inorganic constitution in the finished coating.

It is also possible for the at least predominantly inorganic binder (in the coating) to be modified by organic side chains and be able to form hybrid layers, i.e. layers having a mixed inorganic/organic binder matrix.

The nanocomposites which are preferably used according to the invention and the production thereof by the sol-gel process are known in the prior art, in particular from DE 103 26 815 A1. Here, it is preferred that the nanosize solid particles have been surface-modified by means of a surface-modifying agent having a molecular weight of less than 1500, in particular a surface-modifying agent which contains an anhydride group, acid amide group, amino group, SiOH group, hydrolyzable radicals of silanes and/or a β-dicarbonyl group.

In a preferred embodiment, the binder can be obtained by the sol-gel process by reaction of one or more silanes of the general formula (I):

$$R_xSiA_{(4-x)} \quad (I)$$

where the radicals A are identical or different and are hydroxyl groups or hydrolyzable groups, the radicals R are identical or different and are nonhydrolyzable groups and x is 0, 1, 2 or 3, with x being ≥1 for at least 50% of the molar amount of the silanes.

In another preferred embodiment, the binder is in the form of an above-described nanocomposite which can be obtained by the sol-gel process by reaction of one or more silanes of the general formula (I) in the presence of the nanosize solid particles or precursors of these nanosize solid particles which are converted by the sol-gel process into these solid particles, $$R_xSiA_{(4-x)} \quad (I)$$

where the radicals A are identical or different and are hydroxyl groups or hydrolyzable groups, the radicals R are identical or different and are nonhydrolyzable groups and x is 0, 1, 2 or 3, with x being ≥1 for at least 50% of the molar amount of the silanes.

If only silanes of the formula (I) with x=0 are used, purely inorganic nanocomposites are obtained; otherwise, the preferred organic-inorganic nanocomposite which is, in a preferred embodiment, converted in the form of the coating matrix by means of a heat treatment into a purely inorganic coating is obtained.

Suitable examples of silanes of the formula (I) above are likewise given in DE 103 26 815 A1. In particular, alcoholic $SiO_2$-forming sols are used as $SiO_2$ precursors.

In a further embodiment, the binder contains boehmite nanoparticles having a preferred average dispersed particle size of 1-100 nm, more preferably 1-40 nm and particularly preferably 2-20 nm. It is possible to use commercially available boehmite powder, for example as marketed by Sasol in the grades Disperal or Dispal, with preference being given to using a powder of this type having the product designation Disperal P2.

In a further preferred embodiment, the binder comprises a mixture of a boehmite sol and an $SiO_2$ sol, preferably a mixture of a boehmite sol and an $SiO_2$ sol in a weight ratio of about 1:1, based on the solids content of the sols.

The hard material particles preferably comprise a material which, under the respective use conditions, does not react chemically either with the materials of the components to be joined or with the surrounding medium.

The hard material particles are preferably selected from the group consisting of carbides, nitrides, borides, diamond, $SiO_2$ and $Al_2O_3$, more preferably from the group consisting of diamond, silicon carbide and boron carbide, particularly preferably silicon carbide and diamond. The hard material particles advantageously have hardnesses which are greater than those of the substrate and of the later counterbody to be joined. The suitable hard materials therefore generally have a hardness greater than 1000 HV.

The size of the hard material particles should be selected so that the surfaces to be joined (substrate and counterbody) are not damaged so that cracks are initiated in the materials under load. The hard material particles preferably have an average particle size $d_{50}$ (measured by means of laser light scattering) of 1-100 μm, more preferably 4-50 μm and particularly preferably 10-40 μm.

To improve the penetration into both surfaces and to achieve an increase in the coefficient of friction, it is possible to use hard materials which have a splintery particle shape, for example silicon carbide and monocrystalline diamond.

It is also possible to use hard material particles which can be obtained in a comparatively narrow particle size distribution, for example diamond (polycrystalline or monocrystalline).

The proportion of hard particles is preferably selected so as to give a surface occupation with hard particles of 1-50%, preferably 5-50% and particularly preferably 10-40%.

Possible substrate materials for the shaped bodies of the invention are metallic materials but also ceramic materials, glass, plastic, paper, woven fabrics and wood. As metallic materials, it is possible to use all conventional materials of construction, for example lightweight metal materials, steel alloys, gray cast iron or sintered steel. Possible combinations of metallic joint partners are, for example, 42CrMo4 with St52, GGG700 with 42CrMo4 and 42CrMo4 with 42CrMo4, which can be used for shaft-hub connections.

In a further embodiment in which the shaped body of the invention is used as securing element for screw connections, the substrate of the shaped body of the invention is a metallic plate or foil and the friction-increasing layer is applied to both sides of the plate or foil, with the hard material particles preferably occupying 1-80%, more preferably 15-60%, of the respective surface of the friction-increasing layer.

The coating suspension of the invention can be produced by homogenizing the hard material particles and optionally further components such as fillers, dispersants/plasticizers, film formers, antifoams, colorants or auxiliaries in the solvent-containing binder.

The components optionally added can be organic auxiliaries such as polyvinyl butyral (PVB), polyvinyl alcohol (PVA), polyethylene glycol (PEG) and waxes.

In addition, polymer precursors or partially polymerized polymers can be present to form hybrid layers having bonds of such a type that covalent and/or ionic-covalent bonds are formed to surface-modified ceramic particles or metal-organic precursors.

A preferred water-containing coating suspension can be obtained by a process which comprises the following steps:
i) production of a boehmite sol in an aqueous medium,
ii) addition of the remaining constituents with simultaneous homogenization.

To produce the boehmite sol in step i), it is possible to use commercially available boehmite powder grades having primary particle sizes in the nanometer range, for example the abovementioned, commercially available boehmite powders from Sasol. The boehmite powders are stirred into an aqueous medium, preferably water, which has preferably been preheated, preferably to temperatures above 80° C. As an alternative, a boehmite sol can be produced via alkoxide routes as per the Yoldas process or by use of aluminum salts and addition of a base. After homogenization, the dispersion is usually peptized and converted into a sol by addition of acid. Solids concentrations in the sol of up to 20% by weight of boehmite, preferably 5-12% by weight, can advantageously be set. To adjust the resulting layer properties and maximum layer thicknesses of the binder matrix, the boehmite sol can be admixed with further components.

The boehmite sol produced in step i) serves as dispersion medium into which the remaining constituents of the coating suspension are introduced by addition of the components a little at a time with simultaneous homogenization (step ii)). Homogenization can be effected by means of conventional stirring devices, e.g. a blade stirrer.

A mixture of the boehmite sol with an $SiO_2$ sol (for example Dynasylan® SIVO 110; from Evonik Degussa) which forms a sol-gel coating which cures at low temperatures has been found to be particularly advantageous. The individually applied sols each allow layer thicknesses of from about 0.5 to 2 μm before flaking occurs. Defect-free layer thicknesses of about 5-8 μm can be achieved according to the invention by means of an about 1:1 mixture of a boehmite sol with an $SiO_2$ sol.

The maximum layer thickness of sol-gel systems can be increased by use of fillers, preferably inorganic fillers, which have an average particle diameter which is greater than 100 nm and less than five times the layer thickness. An increase in the layer thickness is particularly useful for relatively large hard material particles.

The shaped bodies of the invention can be obtained by a process which comprises the following steps:
a) provision of a substrate,
b) application of a suspension according to the invention as described above to at least one part of the surface of the substrate,
c) drying of the coating obtained in this way and
d) optionally heat treatment of the coating obtained in step c) so as to cure said coating and/or mechanical treatment of the coating obtained in this way.

To achieve better wetting of the substrate surface, the substrate can be pretreated with a primer, for example by spraying on or rubbing in the binder or the diluted binder (without hard material particles), to obtain a layer thickness of significantly below 1 μm.

The application in step b) is preferably carried out in one step and can be effected by coating methods such as spraying, printing (for example pad printing), spin coating or flooding.

For this purpose, the rheological properties of the coating suspension have to be matched to the respective process by addition of suitable additives. The ideal process depends on the boundary conditions which are largely determined by the geometry of the coating surface and its accessibility. In the case of spray processes, it also has to be ensured that overspray is avoided by means of a suitable masking method. To ensure a very homogeneous layer thickness distribution, a spray process using a comparatively low-viscosity coating suspension is preferred. In this way, any nonuniform layer thickness distribution is automatically compensated, with the particles generally being embedded very well into the matrix, which prevents undesirable breaking-out of the particles, as a result of good wetting. These methods are preferred because the formation of a particle monolayer and the formation of a suitable matrix layer thickness in which the particles project sufficiently from the matrix are ensured thereby. In processes such as dipping of the substrate into the coating suspension or two-stage layer buildup comprising the primary application of the matrix and the secondary introduction of the particles, e.g. by sprinkling on, these two important points (monolayer of hard material particles and homogeneous, reproducible setting of the matrix layer thickness) cannot be ensured. These latter processes are thus possible but not preferred.

The layers are preferably applied by spraying. The coating can, for example, be applied manually by means of an HVLP spray gun (e.g. having a 1 mm nozzle diameter). Preference is given to automated application using surface coating guns, e.g. by means of robots to set always constant application spacings, application speeds and degrees of cover. In addition, jet widening, spray pressure, transport speed of the media, etc., can be set in spray application.

During spray application, the particle dispersion is circulated in the stock vessel in such a way that the particle concentration per unit volume remains constant over time. This makes it possible to ensure that, with an optimal spraying procedure, the surface is always uniformly loaded with particles.

However, it is also conceivable to use a spray can filled with a suitable coating dispersion with the aid of a propellant or pressurized gas. This also makes simple mobile use possible and may thus also allow in-house repair of layers on large components by the user.

The drying of the still moist coating in step c) can be carried out at room temperature, but preferably at temperatures of from 30 to 80° C.

The optional subsequent processes in step d) can include a mechanical treatment and/or curing by means of a heat treatment, with it also being possible to carry out only a heat treatment or a mechanical treatment and, if both are carried out, the order of these two steps also being able to be reversed. The mechanical treatment can be, for example, compaction or partial pressing of the particles into the substrate. A heat treatment for the purpose of curing in step d) is carried out at temperatures of from 100° C. to 800° C., depending on the system and substrate.

The sol-gel layer systems described have the very important property of forming very thin and homogeneous layers, which leads to a very uniform layer thickness distribution on the substrate.

The incorporation of nanoparticles allows the abrasion resistance to be improved. Furthermore, the coating can additionally contain additions of colored and/or fluorescent particles. As a result, for example, the applied layer thickness can easily be checked visually and the coated component gains a further recognition or antipiracy feature. A further possibility is to enable inspection for layer defects in an X-ray transmission method by incorporation of contrast-imparting particles.

The hard material particles should ideally form a monolayer. The hard material particles have to project at least partly from the binder matrix in order to be able to achieve a friction-increasing effect. The average particle diameter should be greater than the average matrix layer thickness. The average hard material particle diameter should preferably be at least twice the average matrix layer thickness. The average hard material particle diameter can, depending on the application, also be three times the average matrix layer thickness, for example when at least one of the joint partners consists of a relatively soft material. In the case of joint partners having relatively high surface roughnesses, relatively large particles are preferably used.

The coating suspension of the invention can be applied as coating to one of the two joint partners, but a thin foil/film or relatively thick plate coated on both sides can also be used as joining element between the two joint partners. Such a joining element serves to produce friction-increasing frictional joining of components. The foil/film can comprise, for example, metal, plastic, paper or woven fabric, and the relatively thick plate can comprise metal, plastic, ceramic, glass or wood. If a coated foil/film is used, the thickness of the foil/film can be selected as a function of the application and be, for example, 0.1 mm.

The coated shaped bodies are used in press or clamp connections. On stressing, micro-positive locking occurs between coated and uncoated shaped bodies as a result of the coating according to the invention and the coefficient of static friction is increased. Examples of press or clamp connections are shrink connections such as shaft/hub connections on the main shaft and generator shaft of wind turbines, flange connections in the engine sector, for example attachment of secondary apparatuses to the crank case, flanges of gearboxes, especially of aluminum, and also end face press connections of chain sprocket wheels.

In a further application, the coating of the invention can be used as mechanical securing of screws. Here, a securing element can be used as intermediate layer between screw head and substrate material and/or between nut and substrate material, with the securing element being provided on both sides with the coating according to the invention. As securing element, it is possible to use, for example, a thick plate of a metallic material coated on both sides or a thin metal foil coated on both sides. The coating according to the invention can also be applied directly to undersides of screw heads, the substrate material or the nut. Coating of the screwthread is also possible. In the case of such a coating, the hard material particles preferably occupy 1-80%, more preferably 15-60%, of the respective surface of the friction-increasing layers. The securing plate or the coating of the underside of the screw head, the substrate material, the nut or the thread has the function of securing against turning loose or loss (in experiments on the Junker shaking test bench, the following definition applies: securing against turning loose: after 1000 load changes, the prestressing force must still be at least 80% of the initial value; in the case of securing against loss, from 20 to 80%). When the screw connection is established, micro-physical locking occurs between the corresponding surfaces as a result of the coating according to the invention and leads, compared to mechanical securing of screw connections from the prior art, at least to an equivalent securing effect (securing against turning loose) in respect of securing of the screw, without the disadvantages caused by damage to the counter-surface. The micro-physical locking also allows no additional seizing of the connection. The heat resistance of the securing of the screw is excellent and far superior to the resistance of chemical securing of screws.

EXAMPLES AND COMPARATIVE EXAMPLES

The following examples and comparative examples serve to illustrate the invention.

Example 1

Coating with Ethanolic $SiO_2$ Sol-Gel Binder and Hard Material SiC 87 g of $BaSO_4$ (Sachtoperse HU-N from Sachtleben) are incorporated into 783 g of Inosil SB binder (from Inomat GmbH) by means of a stirring apparatus and subsequently dispersed for 10 minutes by means of an Ultra Turrax (from IKA).

130 g of SiC powder having an average particle size $d_{50}=12$ μm and a $d_{97}$ of 22 μm are incorporated by means of a high-speed mixer into the premix of binder and $BaSO_4$ for one hour. The binder comprises an $SiO_2$ sol-gel nanocomposite containing $SiO_2$ nanoparticles which have been surface-modified with hydrolyzable radicals of silanes. The suspension is applied by means of an HVLP surface coating gun. After drying of the coating at room temperature, the layer is baked at 350° C. for 30 minutes. After baking, the average matrix layer thickness is about 5 μm and the occupation of the surface with SiC particles, determined by optical microscopy, is about 20%.

Example 2

Coating with Boehmite $SiO_2$ Sol Binder and Hard Material SiC 500 ml of water are heated to 85-95° C. 34 g of nanosize boehmite powder are added while stirring vigorously. Homogenization is carried out with vigorous stirring for 10 minutes. The suspension is peptized with 6 ml of concentrated nitric acid at process temperature. An aging step at elevated temperature is not carried out. The sol concentrates during the production procedure. The sol is diluted to a boehmite solids content of 7.1% by weight (corresponding to a content of 8.3 g of hydrated boehmite powder) by addition of water. 500 g of Dynasylan Sivo 110 (Evonik Degussa) are stirred into 500 g of the cold boehmite sol.

80 g of SiC powder having an average particle size of $d_{50}=12$ μm and a $d_{97}$ of 22 μm are incorporated by means of a high-speed mixer into 920 g of premix of boehmite sol and Dynasylan Sivo 110 for one hour.

The suspension is applied by means of an HVLP surface coating gun. After drying of the coating at room temperature, the layer is cured at 200° C. for 30 minutes. After curing, the average matrix layer thickness is about 5 μm and the occupation of the surface by SiC particles, determined by optical microscopy, is about 22%.

Example 3

Coating with Ethanolic SiO₂ Sol-gel Binder and Hard Material SiC 40 g of HDK N20 (Fumed Silica, Wacker-Chemie AG) are incorporated into 830 g of Inosil SB binder (from Inomat GmbH) by means of a stirring apparatus and subsequently dispersed for 60 minutes by means of an Ultra-Turrax (from IKA).

130 g of SiC powder having an average particle size of $d_{50}=35$ μm and a $d_{97}$ of 60 μm are incorporated by means of a high-speed mixer into the premix of binder and HDK N20 for one hour. The binder comprises an $SiO_2$ sol-gel nanocomposite containing $SiO_2$ nanoparticles which have been surface-modified with hydrolyzable radicals of silanes. The suspension is applied by means of an HVLP surface coating gun. After drying of the coating at room temperature, the layer is heated at 100° C. for 30 minutes. The average matrix layer thickness is about 8 μm and the occupation of the surface by SiC particles, determined by optical microscopy, is about 20%.

Comparative Example 1

Coating with PVA Binder and Hard Material SiC 157 g of PVA (Celvol 513, Celanese) are dissolved in 770 g of water by means of a stirring apparatus over a period of one hour. 73 g of SiC powder having an average particle size of $d_{50}=12$ μm and a $d_{97}$ of 22 μm are dispersed in the PVA solution by means of a high-speed mixer.

The suspension is applied by means of an HVLP surface coating gun. After drying of the coating at room temperature, the average matrix layer thickness is about 6 μm and the occupation of the surface by SiC particles, determined by optical microscopy, is about 18%.

Comparative Example 2

Coating with PVB Binder and Hard Material SiC 120 g of PVB (Pioloform BM 18, Wacker-Chemie) are dissolved in 800 g of ethanol by means of a stirring apparatus over a period of one hour. 80 g of SiC powder having an average particle size of $d_{50}=12$ μm and a $d_{97}$ of 22 μm are dispersed in the PVB solution by means of a high-speed mixer.

The suspension is applied by means of an HVLP surface coating gun. After drying of the coating at room temperature, the average matrix layer thickness is about 6 μm and the occupation of the surface by SiC particles, determined by optical microscopy, is about 20%.

Examples 4 to 15 and Comparative Examples 3 to 10

Determination of the Coefficient of Static Friction on the Coated Specimens

The coefficients of static friction were determined on a manual torsional test apparatus having automatic measurement of the angle of rotation, the prestressing force and the applied torque. For this purpose, test specimens were produced from the respective materials. Disk-shaped test specimens having a convex, annular contact surface whose internal diameter was 20 mm and external diameter was 38 mm were used. The surface roughness $R_a$ of all substrates was 1.6 μm. The static friction-increasing sol-gel layers were applied in each case to one of the test specimens. The test specimens were clamped together by means of a central screw. The prestressing force was recorded by means of a load cell. The assembly was in each case pressed together with a pressure of 50 MPa. All parameters were collected via a control unit and transmitted to evaluation software. One of the test specimens was anchored firmly while a torque was applied manually to the second test specimen by means of a lever. The torque was recorded continuously and increased until the join slipped. The slippage was documented by recording the angle of rotation. The coefficient of static friction is determined from the average friction radius and the values of torque and prestressing force measured at a fixed angle of rotation of 0.5°. Each pairing was measured in a statistically significant number. To determine the percentage increase in the coefficient of friction, the coefficient of friction of the pure material pairing was in each case likewise determined in the manner described above. The surfaces were for this purpose precleaned using ethanol and finally cleaned by means of acetone in order to rule out falsification of the measurement results due to foreign materials on the contact surface.

The hardness values of the materials of the test specimens used for the tests are: AlMgSi1: 96 HV 1; 16MnCr5 case-hardened: 700 HV 1; CK45: 313 HV 1; Sint-D30: 165 HV 1; GG25: 308 HV 1.

Before the coating experiments, the surfaces were cleaned using ethanol and acetone. The surface was in some cases also wiped with a cloth impregnated with a coating dispersion, which likewise improves the layer adhesion.

Table 1 shows the relative improvements in the coefficient of static friction between various material pairings which can be achieved by application of a suitable layer according to the invention.

TABLE 1

Examples and comparative examples for the percentage change in coefficients of static friction for various material pairings as a result of the application of a functional layer. All data are based on contact pressures of 50 MPa in torsional tests. The percentage increase in the coefficient of friction is based on uncoated material pairings.

| Example No. | Material pairing (the first-named partner was in each case coated) | Sol-gel binder matrix | Particle type and size | Percentage increase in coefficient of friction [%] |
|---|---|---|---|---|
| I4 | GG25-AlMgSi1 | as example 2 | SiC (12 μm) | 557 |
| I5 | 16MnCr5-16MnCr5 | as example 2 | SiC (12 μm) | 314 |
| I6 | 16MnCr5-16MnCr5 | as example 1 | SiC (12 μm) | 114 |

TABLE 1-continued

Examples and comparative examples for the percentage change in coefficients of static friction for various material pairings as a result of the application of a functional layer. All data are based on contact pressures of 50 MPa in torsional tests. The percentage increase in the coefficient of friction is based on uncoated material pairings.

| Example No. | Material pairing (the first-named partner was in each case coated) | Sol-gel binder matrix | Particle type and size | Percentage increase in coefficient of friction [%] |
|---|---|---|---|---|
| C3 | 16MnCr5-16MnCr5 | PVB | SiC (12 μm) | 7 |
| C4 | 16MnCr5-16MnCr5 | PVA | SiC (12 μm) | 29 |
| I7 | ABS-AlMgSil | as example 2 | SiC (12 μm) | 72 |
| I8 | AlMgSil-AlMgSil | as example 2 | SiC (12 μm) | 609 |
| I9 | AlMgSil-AlMgSil | as example 1 | SiC (12 μm) | 400 |
| C5 | AlMgSil-AlMgSil | PVB | SiC (12 μm) | 91 |
| C6 | AlMgSil-AlMgSil | PVA | SiC (12 μm) | 127 |
| I10 | CK45-GG25 | as example 2 | SiC (12 μm) | 307 |
| I11 | CK45-GG25 | as example 1 | SiC (12 μm) | 136 |
| C7 | CK45-GG25 | PVA | SiC (12 μm) | 14 |
| C8 | CK45-GG25 | PVB | SiC (12 μm) | 14 |
| I12 | SintD30-SintD30 | as example 2 | SiC (12 μm) | 347 |
| I13 | PA6.6-AlMgSil | as example 2 | SiC (12 μm) | 220 |
| C9 | AlMgSil-AlMgSil | Chemical nickel | Diamond (10 μm) | 450 |
| C10 | SintD30-SintD30 | Phenolic resin | SiC (12 μm) | 193 |
| I14 | SintD30-SintD30 | as example 1 | SiC (12 μm) | 265 |
| I15 | GG25-AlMg Sil | Example 3 | SiC (35 μm) | 529 |

Examples "I" are according to the invention; examples "C" are comparative examples.
C10 is a comparative example in accordance with WO 2008/095216.

The material designated as ABS is acrylonitrile-butadiene-styrene copolymer, and PA 6.6 is polyamide 6.6.

Example 16

Securing of a Screw Connection

Stainless steel plates having a thickness of 2 mm and made of the material 1.4301 or 1.4310 and having the size M10 in accordance with DIN ISO 7089 were provided with the coating according to example 2, with diamond having an average particle size of 25 μm being used here instead of SiC. The layers were cured at 180° C., and the average matrix layer thickness was about 8 μm.

The suitability for securing against turning loose was determined on a shaking test apparatus (from Junker) in accordance with DIN 65151 using a dynamically changing transverse load at a frequency of 12.5 Hz. For this purpose, the plate was tightened by means of a black M10 screw in accordance with DIN EN ISO 4017 of the strength class 10.9 in accordance with ISO 898-1 until a prestressing force of 40 kN was reached. The contact surface comprised the material 16MnCr5 and had a roughness of $R_a=1$. The clamping length ratio was 1.5. After 1000 load changes, the average prestressing force was 90% of the initial value. The plate thus satisfies the criterion for securing against turning loose, according to which a prestressing force of at least 80% of the initial value still has to be present after 1000 load changes.

The invention claimed is:

1. A suspension for producing a friction-increasing layer on a substrate comprising:
a liquid suspension medium, a predominantly inorganic $SiO_2$-based binder or precursor compounds thereof, and suspended hard material particles selected from the group consisting of diamond, silicon carbide, and boron carbide,
wherein the friction-increasing layer has a thickness less than an average particle size of the hard material particles so the hard material particles project from the friction-increasing layer.

2. The suspension as claimed in claim 1, wherein the binder is a nanocomposite composed of silicon-organic $SiO_2$ precursors from production via a sol-gel process containing nanosize solid particles.

3. The suspension as claimed in claim 2, wherein the nanosize solid particles are metal oxide particles selected from among $SiO_2$, $TiO_2$, $ZrO_2$, $Al_2O_3$, $AlOOH$, $Y_2O_3$ and $CeO_2$, c-BN, $BaSO_4$, mixtures thereof or precursors of these nanosize solid particles which are converted via a sol-gel process into these solid particles.

4. The suspension as claimed in claim 1, wherein the binder can be obtained by the sol-gel process by reaction of one or more silanes of the general formula (I):

$$R_xSiA_{(4-x)} \qquad (I)$$

where the radicals A are identical or different and are hydroxyl groups or hydrolyzable groups, the radicals R are identical or different and are nonhydrolyzable groups and x is 0, 1, 2 or 3, with x being ≥1 for at least 50% of the molar amount of the silanes.

5. The suspension as claimed in claim 2, wherein the binder can be obtained by the sol-gel process by reaction of one or more silanes of the general formula (I) in the presence of the nanosize solid particles or precursors of these nanosize solid particles which are converted by the sol-gel process into these solid particles, $$R_xSiA_{(4-x)} \qquad (I)$$

where the radicals A are identical or different and are hydroxyl groups or hydrolyzable groups, the radicals R are identical or different and are nonhydrolyzable groups and x is 0, 1, 2 or 3, with x being ≥1 for at least 50% of the molar amount of the silanes.

6. The suspension as claimed in claim 1, wherein the binder comprises boehmite nanoparticles having an average dispersed particle size of 2-20 nm.

7. The suspension as claimed in claim 6, wherein the binder comprises a mixture of a boehmite sol and an $SiO_2$ sol in a weight ratio of about 1:1, based on the solids content of the sols.

8. The suspension as claimed in claim 1, wherein the liquid suspension medium is selected from among water, water-containing solvents, alcoholic solvents and mixtures thereof.

9. The suspension as claimed in claim 1, wherein the hard material particles have an average particle size $d_{50}$ of 10-40 μm.

10. A shaped body comprising:
a substrate and
a friction-increasing layer, which has been applied to at least part of a surface of the substrate, and comprises a predominantly inorganic binder matrix and hard material particles embedded therein,
wherein the thickness of the binder matrix is less than the average particle size of the hard material particles so that the hard material particles project from the binder matrix, and
wherein the friction-increasing layer has been formed from the suspension as claimed in claim 1.

11. The shaped body as claimed in claim 10, wherein the substrate comprises a metallic or ceramic material, glass, plastic, paper, woven fabric or wood.

12. The shaped body as claimed in claim 10, wherein the hard material particles occupy 10-40% of the surface of the friction-increasing layer.

13. The shaped body as claimed in claim 12, wherein the substrate is a metallic plate or foil and the friction-increasing layer is applied to both sides of the plate or foil.

14. The shaped body as claimed in claim 10, wherein the substrate is a metallic plate or foil and the friction-increasing layer is applied to both sides of the plate or foil and the hard material particles occupy 15-60% of the respective surface of the friction-increasing layers.

15. A process for producing a shaped body as claimed in claim 10, which comprises the steps
   a) provision of a substrate,
   b) application of a suspension for producing a friction-increasing layer on a substrate, which comprises a liquid suspension medium, a predominantly inorganic $SiO_2$-based binder or precursor compounds thereof and suspended hard material particles to at least part of the surface of the substrate so the hard material particles project from the friction-increasing layer,
   c) drying of the coating obtained in this way and
   d) optionally heat treatment of the coating obtained in step c) in order to cure the coating and/or mechanical treatment of the coating obtained in this way.

16. The process as claimed in claim 15, wherein the heat treatment for curing the coating in step d) is carried out at temperatures of 100-800° C.

17. The process as claimed in claim 15, wherein the mechanical treatment in step d) serves to compact the coating or press the hard material particles partly into the substrate.

\* \* \* \* \*